(12) United States Patent
Aoki et al.

(10) Patent No.: US 7,531,961 B2
(45) Date of Patent: May 12, 2009

(54) PLASMA DISPLAY WITH PHOSPHORS CONTAINING A β-ALUMINA CRYSTAL STRUCTURE

(75) Inventors: Masaki Aoki, Osaka (JP); Hiroyuki Kawamura, Osaka (JP); Kazuhiko Sugimoto, Kyoto (JP); Hiroshi Setoguchi, Osaka (JP); Junichi Hibino, Osaka (JP); Yoshinori Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 857 days.

(21) Appl. No.: 10/503,301

(22) PCT Filed: Sep. 26, 2003

(86) PCT No.: PCT/JP03/12347

§ 371 (c)(1),
(2), (4) Date: Aug. 3, 2004

(87) PCT Pub. No.: WO2004/030009

PCT Pub. Date: Apr. 8, 2004

(65) Prior Publication Data

US 2005/0146271 A1  Jul. 7, 2005

(30) Foreign Application Priority Data

Sep. 27, 2002  (JP) ............... 2002-283185
Oct. 29, 2002  (JP) ............... 2002-313911

(51) Int. Cl.
*H01J 17/49*  (2006.01)

(52) U.S. Cl. .............. 313/582; 313/586; 313/583; 313/584; 313/585; 313/486; 313/487
(58) Field of Classification Search .................... None
See application file for complete search history.

(56) References Cited

U.S. PATENT DOCUMENTS 7,183,705 B2 *  2/2007  Aoki et al. ............... 313/486

FOREIGN PATENT DOCUMENTS

| EP | 0 921 172 | 6/1999 |
|---|---|---|
| JP | 11-086735 | 3/1999 |
| JP | 11-119726 | 4/1999 |
| JP | 2000-251701 | 9/2000 |

OTHER PUBLICATIONS

English machine translation of JP 2000-251701.*

* cited by examiner

*Primary Examiner*—Sikha Roy
*Assistant Examiner*—Natalie K Walford
(74) *Attorney, Agent, or Firm*—Wenderoth, Lind & Ponack, L.L.P.

(57) ABSTRACT

Phosphor layers (110G, 110B, and 110R) are made of a combination of: blue and green phosphors that are positively charged on their surfaces and baked in an oxygen-nitrogen atmosphere to reduce oxygen vacancy, and that have a β-alumina crystal structure; and a red phosphor made of an yttrium oxide compound. Uniformly forming such phosphor layers on the wall surfaces of barrier ribs (109) provides equal charge characteristics of the phosphors of respective colors, reduces oxygen vacancy in the phosphors, and inhibits adsorption of various gases in the panel production process. This can stabilize the discharge characteristics and prevent luminance degradation at driving the panel.

1 Claim, 4 Drawing Sheets

PLASMA DISPLAY WITH PHOSPHORS CONTAINING A β-ALUMINA CRYSTAL STRUCTURE

TECHNICAL FIELD

The present invention relates to a plasma display device that is used for displaying an image on a television (TV) set or other equipment and has phosphor layers excited by ultraviolet light to emit light.

BACKGROUND ART

In color display devices employed for image display on computers or TV sets, a plasma display device having a plasma display panel (hereinafter referred to as a PDP) has recently received considerable attention as a color display device with large sized screen but lightweight body due to its low-profile structure.

A plasma display device displays images in full color by performing an additive color mixing process on red, green, and blue—known as the three primary colors. To realize the full color display, the plasma display device has phosphor layers that are respectively prepared for emitting red (R), green (G), and blue (B) of the three primary colors. A phosphor layer is formed of phosphor particles. The phosphor particles are excited by ultraviolet light generated in a discharge cell in the PDP, so that visible light of red, green, and blue are produced.

A well-known combination of chemical compounds for the phosphors above are: $(Y,Gd)BO_3:Eu^{3+}$ and $Y_2O_3:Eu^{3+}$ for emitting red light and positively charged; $Zn_2SiO_4:Mn^{2+}$ for emitting green light and negatively charged; and $BaMgAl_{10}O_{17}:Eu^{2+}$ for emitting blue light and positively charged (for example, see O plus E; Feb, 1996, No. 195 pp 99 and 100.)

It is also disclosed that a phosphor $Zn_2SiO_4:Mn^{2+}$, for example, is produced through solid phase reaction. In this method, specified materials are mixed, and baked at high temperatures of at least 1,000° C. (for example, see *Phosphor Handbook*, pp 219 and 220, Ohmsha). After the baked phosphor particles are lightly milled so that aggregated particles loosen and breakage of crystals causing luminance degradation does not occur, they are classified so that red and green phosphors have an average particle diameter of 2-5 μm, and the blue phosphor 3-10 μm.

The phosphor particles are milled and classified for the following reason. In general, when phosphor layers are formed on a PDP, a method of screen-printing a paste of phosphor particles of each color, or an ink jet method of discharging a phosphor paste from a nozzle for application is used. In application of the paste, the smaller and more uniform diameters of phosphor particles (i.e. a uniform particle size distribution) can easily provide a smoother coated surface. Particularly in forming phosphor layers using an ink jet method, non-uniform application or clogging of a nozzle may occur because large aggregates are included in the phosphors if the particles are not lightly milled and classified (for example, see Japanese Patent Unexamined Publication No. H06-273425). That is, when phosphor particles have smaller and more uniform diameters and shapes approximating to a sphere, the coated surface is smoother. The smoother coated surface increases the packing density of the phosphor particles in a phosphor layer. As a result, the emission surface area of the particles increases, and the luminance of the plasma display device increases.

Additionally disclosed is another PDP in which a $Zn_2SiO_4:Mn$ green phosphor negatively charged on its surface and a positively charged green phosphor $ReBO_3:Tb$ (where Re are rare-earth elements, e.g. Sc, Y, La, Ce, and Gd) are mixed to produce an apparently positively charged phosphor, and a $BaMgAl_{10}O_{17}:Eu$ blue phosphor and a $(Y,Gd)BO_3:Eu$ red phosphor that are positively charged are used (for example, see Japanese Patent Unexamined Publication No. 2001-236893).

However, a plasma display panel produced by using $BaMgAl_{10}O_{17}:Eu$ as a blue phosphor, $Zn_2SiO_4:Mn$ as a green phosphor, and $(Y,Gd)BO_3:Eu$ or $Y_2O_3:Eu$ as a red phosphor has the following problem.

In these phosphors, blue and red phosphors are positively charged on their surfaces. However, the green phosphor made of $Zn_2SiO_4:Mn$ is negatively charged on its surface. This is because the ratio of $SiO_2$ to ZnO ($1.5ZnO/SiO_2$) is larger than the stoichiometric mixture ratio ($2ZnO/SiO_2$), and thus the surface of the $Zn_2SiO_4:Mn$ crystal is covered with $SiO_2$. When negatively charged phosphor and positively charged phosphor coexist in a PDP, negative charges remain only on the negatively charged phosphor at driving the panel especially after the entire panel is light up and put off. For this reason, in application of voltages for display, variation in discharge, or addressing failure, i.e. no discharge, occurs.

Additionally, because the surface of $Zn_2SiO_4:Mn$ is covered with $SiO_2$, gas can easily be adsorbed. For this reason, $Zn_2SiO_4:Mn$ adsorbs a large amount of water ($H_2O$), carbon monoxide (CO), carbon dioxide ($CO_2$), or hydrocarbon (CxHy). Theses gases are emitted into the panel in an aging process after a panel sealing process. These gases are adsorbed onto the surface of MgO, causing addressing failure and deteriorating the discharge characteristics. Additionally, these gases adsorbed onto the surface of the blue phosphor $BaMgAl_{10}O_{17}:Eu$, causing luminance degradation of the blue phosphor and color shift, i.e. decrease in the color temperature of the panel caused by increase in the y value of chromaticity. Further, Ne positive ions and CH positive ions collide with the negatively charged green phosphor, thus causing luminance degradation of the phosphor.

On the other hand, even when a green phosphor $Zn_2SiO_4:Mn$ negatively charged on its surface and a green phosphor $ReBO_3:Tb$ (where Re are rare-earth elements, e.g. Sc, Y, La, Ce, and Gd) positively charged are mixed to produce an apparently positively charged phosphor, and a positively charged blue phosphor $BaMgAl_{10}O_{17}:Eu$ and a positively charged red phosphor $(Y,Gd)BO_3:Eu$ are used, the following problem occurs. These phosphors contain $Zn_2SiO_4$ likely to adsorb water ($H_2O$) and hydrocarbon (CxHy), and $BaMgAl_{10}O_{17}$ likely to adsorb water ($H_2O$). For this reason, water ($H_2O$), carbon monoxide (CO), carbon dioxide ($CO_2$) and hydrocarbon (CxHy) emitted into the panel during discharge deteriorate MgO and cause addressing failure and degrade discharge characteristics, further causing the luminance degradation and color shift of $BaMgAl_{10}O_{17}:Eu$.

The present invention addresses these problems, and aims to provide a plasma display device in which phosphor layers are stably formed and has no degradation of luminance and chromaticity, and stable discharge characteristics.

SUMMARY OF THE INVENTION

To attain this objective, the phosphor layers of a plasma display device of the present invention has: a green phosphor layer made of an aluminate compound phosphor having a β-alumina crystal structure or an yttrium oxide compound phosphor; a blue phosphor layer made of an aluminate compound phosphor having a β-alumina crystal structure; and a red phosphor layer made of an yttrium oxide compound phosphor.

DETAILED DESCRIPTION OF A PREFERRED EMBODIMENT

First, a positively charged green phosphor of the present invention is described.

A conventional green phosphor $Zn_2SiO_4$:Mn is made by a solid-phase reaction method, and the surface of the $Zn_2SiO_4$:Mn crystal is covered with $SiO_2$, because $SiO_2$ is made of the composition larger than the stoichiometric mixture ratio. Even if the $Zn_2SiO_4$:Mn is made according to the stoichiometric mixture ratio, $SiO_2$ deposits on the surface of the phosphor after the phosphor is baked at temperatures of at least 1,100° C. For this reason, the surface of $Zn_2SiO_4$:Mn is negatively charged, which is different from positively charged blue and red phosphors. This affects discharge characteristics. In the present invention, using the composition of an aluminate compound phosphor $xBaO.yMgO.zAl_2O_3.aMnO$ or $xBaO.yAl_2O_3.zMnO$ that has β-alumina structure and is originally positively charged on its surface, as a green phosphor, and adding Mn as the emission center of the green phosphor make the charge of the phosphor surface positive. Further, when positively charged green phosphor, such as $YBO_3$:Tb, is used, the phosphor is mixed with an aluminate compound green phosphor, because Tb emits yellow green light.

The green phosphor of the present invention is made of an aluminate having a β-alumina crystal structure and lacking BaO (a molar ratio of BaO being 1 or smaller). Because the alumina crystal structure of this $xBaO.yMgO.zAl_2O_3.aMnO$ or $xBaO.yAl_2O_3.zMnO$ is a crystal system having a layer structure and high emission efficiency, phosphors having high luminance can be provided. However, because the process of substituting bivalent Mn ions mainly emitting light for the BaO site or MgO site (spinel site) is made by baking them in a neutral or weak reducing atmosphere, a large amount of oxygen vacancy occurs in the vicinity of the BaO or MgO site. However, even in oxygen vacancy, the phosphor is kept positively charged. Phosphors having oxygen vacancy are influenced by the aforementioned adsorbed gases. However, substituting trivalent ions for a part of bivalent Mn ions by baking the green phosphor in an oxidizing atmosphere before application can excessively positively charge the vicinity of the MgO site, AlO site, or BaO site. When the site is excessively positively charged, negatively charged oxygen (O) diffuses in the vicinity of BaO, AlO, or MgO to fill the vacancy and neutralize the charge. As a result, the knowledge of reducing the oxygen vacancy has been obtained.

To prevent the oxygen vacancy occurring during baking in a weak reducing atmosphere, a small amount of MgO is added to $BaO—A_2lO_3—MnO$ aluminate, or trivalent ions substitute for a part of bivalent Mn ions. For example, it is effective in increasing positive charges in the vicinity of BaO site or MgO site to bake a green phosphor in an oxidizing atmosphere and substitute trivalent ions for a part of bivalent Mn ions substituted for Ba. This is because negatively charged oxygen diffuses and fills the oxygen vacancy in the vicinity of BaO to neutralize the increased positive charges, and thus the oxygen vacancy is decreased.

Now, as an example of fabricating a phosphor, a description is provided of the production of an aluminate compound green phosphor by a solid-phase reaction method. The materials, i.e. carbonates and oxides, such as $BaCO_3$, $MgCO_3$, $MnCO_3$, and $A_2lO_3$, are prepared to have the composition of a phosphor $xBaO.yMgO.zA_2lO_3.aMnO$ or $xBaO.yA_2lO_3.zMnO$. After a small amount of fluxing agent ($AlF_3$ or $NH_4Cl$) is added as a sintering agent, the mixture is baked at temperatures ranging from 1,100 to 1,500° C. Then, the baked compound is milled and classified and then baked in a neutral ($N_2$) or weak reducing atmosphere (1% $H_2$-99% $N_2$) at temperatures ranging from 1,200 to 1,500° C. Thereafter, phosphor particles having an average diameter ranging from 0.2 to 3 μm are provided by milling and classifying again.

In the composition of $xBaO.yMgO.zA_2lO_3—aMnO$, β-alumina crystal structure can easily be obtained, when the ratios of BaO (x), MgO (y), $A_2lO_3$ (z) and, MnO (a) are within the following ranges: $0.7 \leq x \leq 0.95$, $0.5 \leq y \leq 0.2$, $6.0 \leq z \leq 6.0$, and $0.05 \leq a \leq 0.2$.

On the other hand, in the composition of $xBaO.yA_2lO_3.zMnO$, a β-alumina crystal structure can easily be obtained, when the ratios of BaO (x), $A_2lO_3$ (y) and, MnO (z) are within the following ranges: $0.7 \leq x \leq 0.95$, $5 \leq y \leq 6$, $0.05 \leq z \leq 0.2$. Preferably, the substitution amount of Mn, i.e. light-emitting ions, to the elements in the base crystal should range from 5 to 20 mol %, to provide proper luminance and prevent luminance degradation. When x, y, z, and a are out of the above range, the single phase of the β-alumina is not produced, other impurities are produced, and luminance degradation and deterioration caused by ultraviolet light are severe.

To decrease luminance degradation caused by ultraviolet light that has a wavelength of 147 nm and is generated in various heat treatment processes (phosphor baking and panel sealing) in panel production and during driving of the panel, this phosphor is further baked in an oxidizing atmosphere ($N_2—O_2$) at temperatures ranging from 600 to 1,000° C. (preferably, 650 to 950° C.), to provide a green phosphor in which trivalent ions substitute for a part of bivalent Mn ions.

Next, a description is provided of a method of fabricating a phosphor from aqueous solution. After organometallic salts (e.g. alkoxide and acetylacetone) or nitrates that contain elements constituting the phosphor (Ba Mg, Al, and Mn) are dissolved in water in a compounding ratio that provides the composition of a phosphor $xBaO.yMgO.zA_2lO_3.aMnO$ or $xBaO.yA_2lO_3$-$zMnO$, the solution is hydrolyzed to provide coprecipitate (hydrate). Hydrothermal synthesis is performed on the hydrate (crystallization of the hydrate in an autoclave), or the hydrate is baked in air or atomized into a high-temperature furnace, to provide powder. Thereafter, the obtained powder is baked at temperatures ranging from 1,200 to 1,500° C. for two hours and lightly milled and classified so that the crystal faces are not broken. Next, after the particles are baked in an nitrogen ($N_2$) atmosphere or nitrogen ($N_2$)-hydrogen ($H_2$) atmosphere, they are milled and classified, to provide phosphor particles having an average diameter ranging from 0.2 to 3 μm. Then, these particles are baked in an $O_2$ atmosphere or an $N_2$—$O_2$ atmosphere at temperatures ranging from 600 to 1,000° C., to provide a green phosphor in which trivalent ions substitute for a part of bivalent Mn ions. In this fabrication method, the composition range of each element is the same as that of the solid-phase reaction method.

In this embodiment, the particle diameter of the green phosphor is as small as 0.1 to 3 μm, and the particle size distribution is excellent. However, more preferably, the particle diameter should range from 0.1 to 2 μm. As to the particle size distribution, it is more preferable that a maximum particle diameter is four times the average or smaller, and a minimum particle diameter is one fourth the average or larger. In general, because the region ultraviolet light reaches in a phosphor particle is as shallow as several hundreds nanometers from the surface of the particle, almost only the surface emits light. When the particle diameter is 2 μm or smaller, the ratio of surface area relatively distributing to emission increases and the emission efficiency of the phosphor layer is kept high. In contrast, when the particle diameter is 3 μm or larger, the thickness of the phosphor must be 20 μm or larger; thus sufficient discharge space cannot be ensured. Additionally, when the particle diameter is 0.1 μm or smaller, defects are likely to occur and luminance decreases.

Further, as a green phosphor, $ReBO_3$:Tb (where Re is one of Sc, Y, La, Ce, and Gd) is used, 0.05 to 0.2 mol % of Tb with respect to Re is added, and an yttrium oxide compound phosphor is mixed with an aluminate compound phosphor. For this reason, a positively charged phosphor having high luminance can be provided.

In this embodiment of the present invention, as a blue phosphor, a compound expressed by $Ba_{1-x}MgAl_{10}O_{17}$:$Eu_x$ or $Ba_{1-x-y}Sr_yAl_{10}O_{17}$:$Eu_x$ is used (where $0.05 \leq x \leq 0.2$ and $0.05 \leq y \leq 0.5$). As a red phosphor, a compound expressed by $(Y,Gd)_{1-x}Eu_xBO_3$ or $(Y_{1-x}Eu_x)_2O_3$ is used (where $0.01 \leq x \leq 0.3$).

A plasma display panel (PDP) constituting a plasma display device of the present invention is produced by the steps of: disposing a green phosphor layer, blue phosphor layer, and red phosphor layer on a first panel substrate, using all positively charged phosphor particles of respective colors on their surfaces, and a paste essentially consisting of ethyl cellulose and α-termipeol as a binder; baking out the binder included in the disposed paste; and sealing the first panel having the phosphor layers disposed on the substrate by the baking step and a second panel produced separately.

An exemplary embodiment of a plasma display device according to the present invention is described hereinafter with reference to the accompanying drawings.

Figure 1:
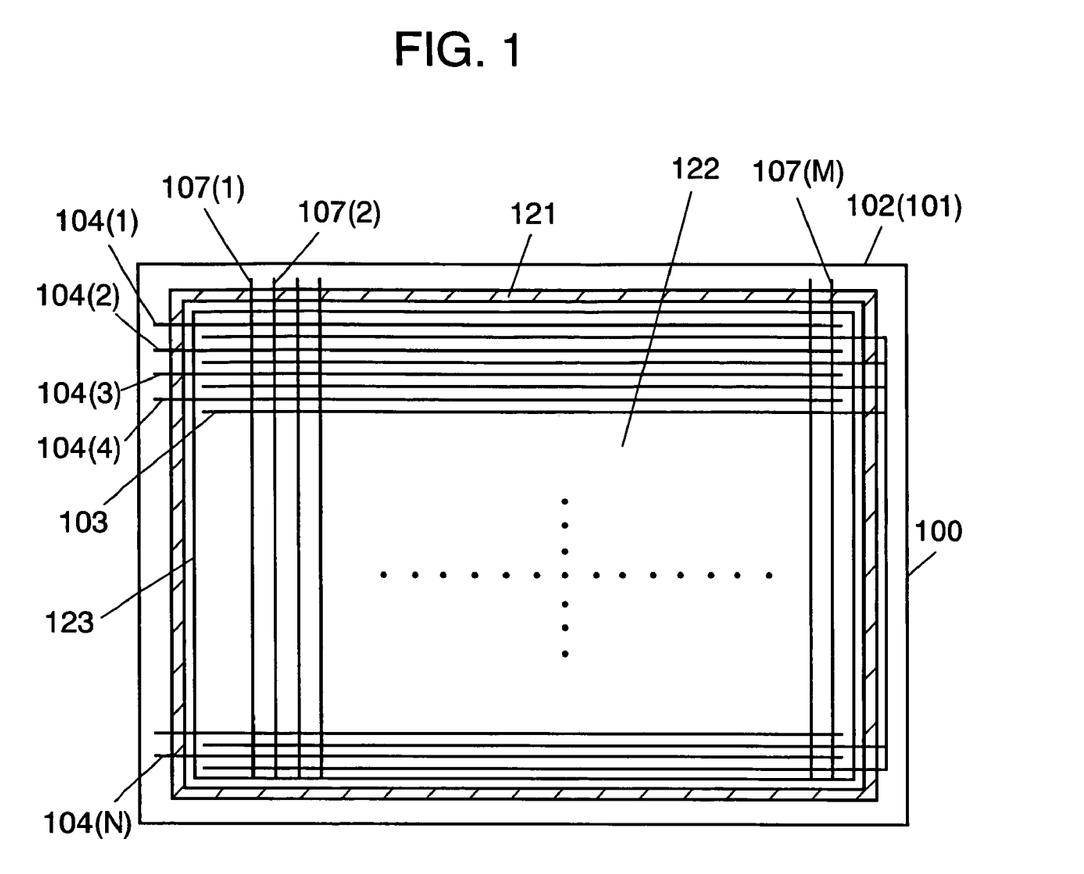
FIG. 1 is a schematic plan view of a plasma display panel (PDP), with a front glass substrate removed, in accordance with an exemplary embodiment of the present invention.

FIG. 1 is a schematic plan view of a plasma display panel (PDP), with a front glass substrate removed, in accordance with an embodiment of the present invention.

Figure 2:
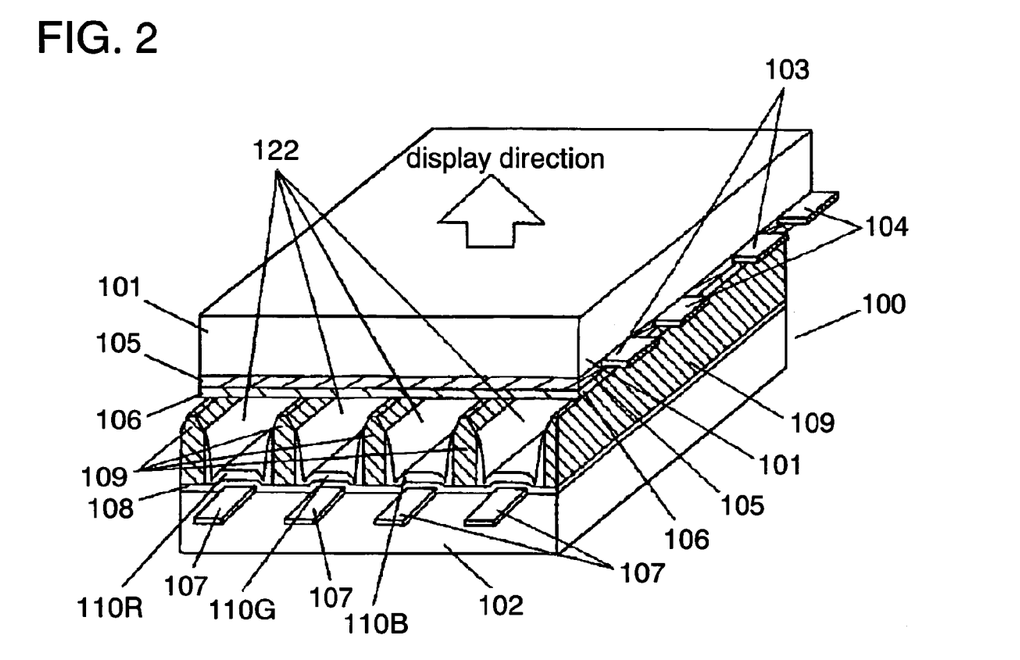
FIG. 2 is a perspective view of the PDP of the embodiment, illustrating a structure of a part of an image display area in section.

FIG. 2 is a perspective view of the PDP, showing an image display area in section. In FIG. 1, the number of display electrodes, display scan electrodes, and address electrodes is reduced for simplicity.

As shown FIG. 1, PDP 100 includes front glass substrate 101 (not shown), rear glass substrate 102, N display electrodes 103, N display scan electrodes 104 (where a parenthesized N indicates the Nth electrode), M address electrode 107 (where a parenthesized M indicates the Mth electrode), and hermetic seal layer 121 shown by hatching. The PDP has an electrode matrix having a three-electrode structure made of display electrodes 103, display scan electrodes 104, and address electrodes 107. Display cells are formed at the respective intersections of display electrodes 103 and display scan electrodes 104, and address electrodes 107. Thus, image display area 123 is formed.

This PDP 100 has, as shown in FIG. 2, front glass substrate 101, and rear glass substrate 102 sealed to each other. The two substrates form discharge space 122 therebetween, which is filled with a discharge gas. On a principle surface of front glass substrate 101, display electrodes 103, display scan electrodes 104, dielectric glass layer 105, and MgO protective layer 106 are disposed. On the other hand, address electrodes 107, dielectric glass layer 108, barrier ribs 109, and phosphor layers 110R, 110G, and 110B are disposed on a principle surface of rear glass substrate 102. Such structured PDP is connected to a PDP driver 150 shown in FIG. 3 to form plasma display device 160.

Figure 3:
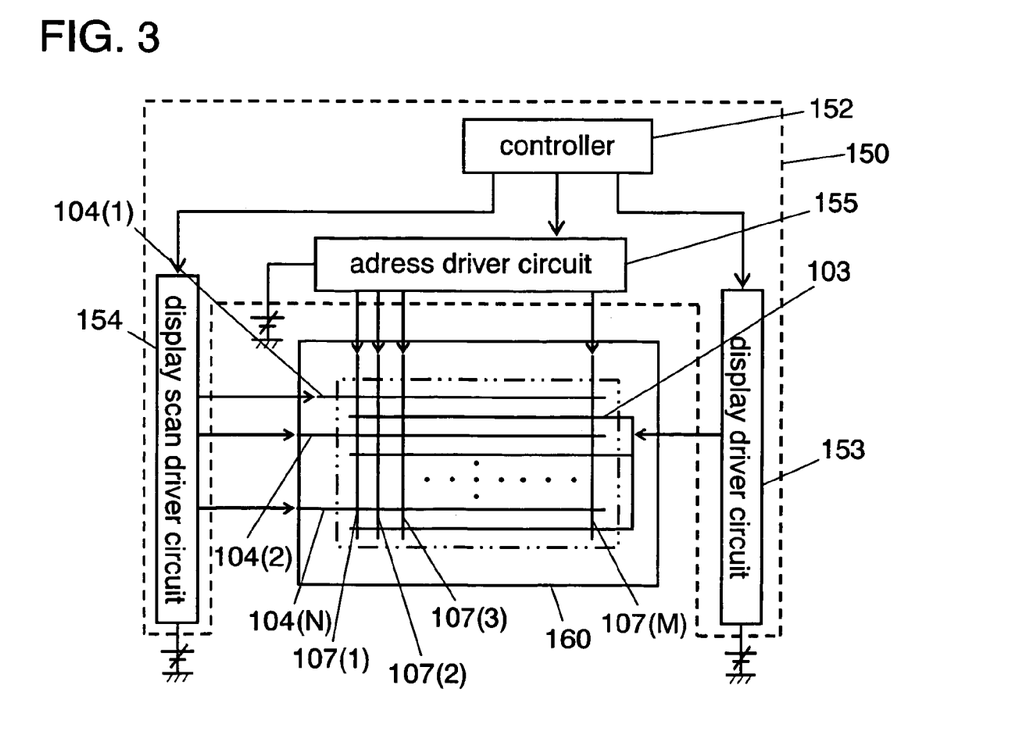
FIG. 3 is a block diagram of the plasma display device using the PDP of the embodiment.

As shown in FIG. 3, plasma display device 160 has display driver circuit 153, display scan driver circuit 154, and address driver circuit 155 in PDP 100. According to the control of controller 152, a voltage is applied across display scan electrode 104 and address electrode 107 of a cell to be lit for address discharge therebetween. Then, a pulse voltage is applied across display electrode 103 and display scan electrode 104, for sustain discharge. The sustain discharge generates ultraviolet light in the cell. The phosphor layers excited by the ultraviolet light emit light, thereby lighting the cell. In this way, a combination of 11t and unlit cells of the respective colors produces an image on the display.

Figure 4:
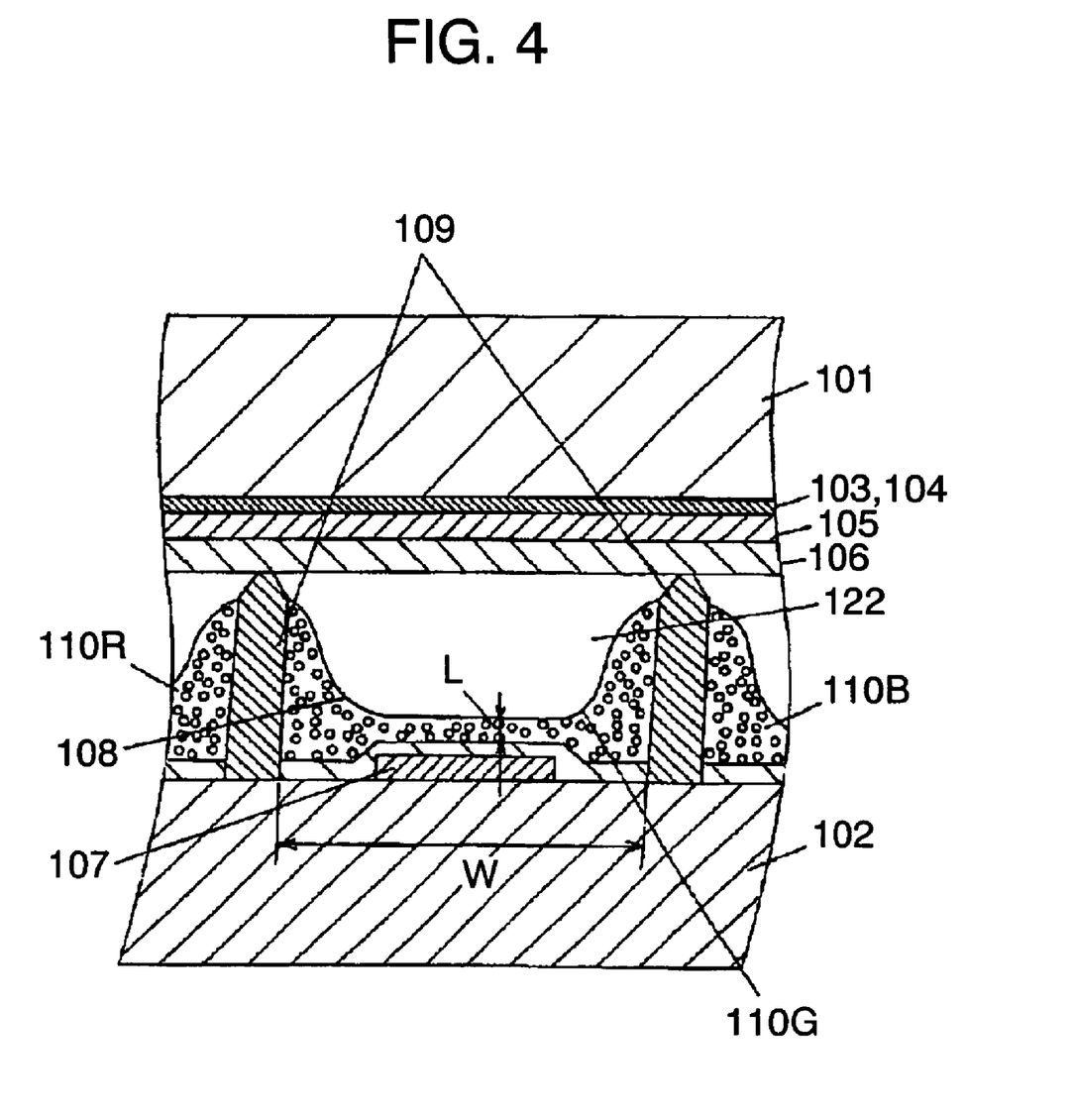
FIG. 4 is a sectional view illustrating the structure of the image display area of the PDP of the embodiment.
Figure 5:
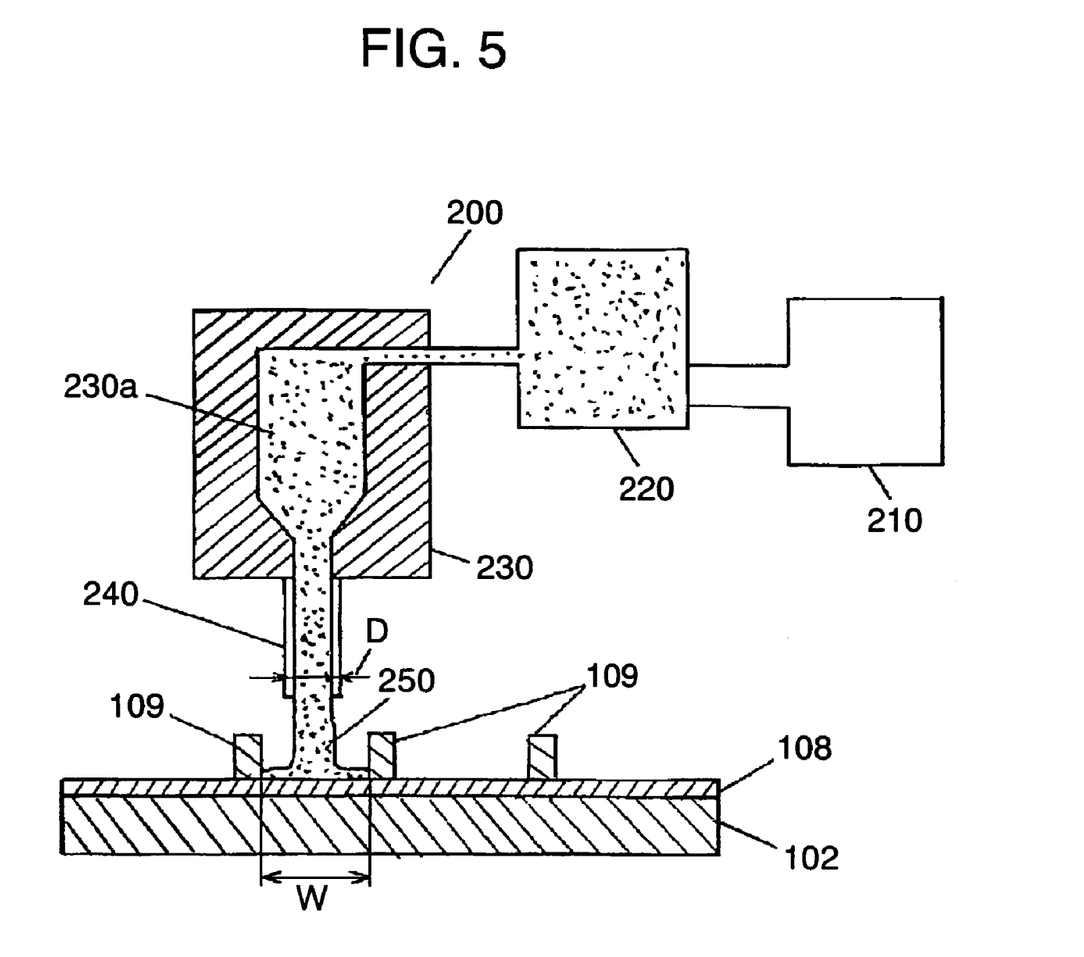
FIG. 5 is a schematic view illustrating a structure of an ink dispenser, which is used in a process of forming a phosphor layer of the PDP of the embodiment.

Now, a description is provided of a method of manufacturing the aforementioned PDP 100 with reference to FIGS. 4 and 5. FIG. 4 is a sectional view illustrating the structure of an image display area of the PDP. With reference to FIG. 4, N display electrodes 103 and N display scan electrodes 104 are arranged on front glass substrate 101 alternately, parallel to each other, like stripes. (In FIG. 2, only two of respective electrodes are shown for simplicity.) Thereafter, the electrodes are covered with dielectric glass layer 105, and further over which, MgO protective layer 106 is formed.

Display electrodes 103 and display scan electrodes 104 are formed of transparent electrodes made of indium thin oxide (ITO) and bus electrodes made of silver. The bus electrodes are formed by applying a silver paste by screen printing and then baking the paste.

Dielectric glass layer 105 is formed by applying a paste containing lead glass material by screen printing, and baking the paste at a specified temperature for a specified period of time (e.g. at 560° C. for 20 min.) to obtain a desired thickness (approx. 20 μm). As to the paste containing lead glass material, a mixture of PbO (70 wt %), $B_2O_3$ (16 wt %), $SiO_2$ (10 wt %), $Al_2O_3$ (5 wt %) and an organic binder (α-terpineol containing 10% of ethyl cellulose dissolved therein) is used. The aforementioned organic binder contains a resin dissolved in an organic solvent. Acrylic resin can be used as a resin other than the ethyl cellulose, and n-butylcarbitol as an organic solvent. Further, a dispersant, e.g. glyceryl trileate, can be mixed into such an organic binder.

MgO protective layer 106 is made of magnesium oxide (MgO). The layer is formed into a specified thickness (approx. 0.5 μm) by sputtering or chemical vapor deposition (CVD) method.

Now, the explanation turns to the rear panel. First, M address electrodes 107 are formed in lines on rear glass substrate 102 by screen-printing a silver paste for electrodes or a photolithography method and then baking the paste. Next, dielectric glass layer 108 is formed by applying a paste containing lead glass material to the address electrodes by screen printing. Further, barrier ribs 109 are formed by repeatedly applying the same paste containing lead glass material to the dielectric glass layer at a specified pitch by screen printing or by a photolithography method. These barrier ribs 109 divide, in the direction of the lines, discharge space 122 into respective cells (i.e. unit emission area).

As shown in FIG. 4, interval dimension W between barrier ribs 109 is determined to a value ranging from approx. 130 to 240 μm, according to a high definition television (HD-TV) screen having a diagonal size ranging from 32 to 50 in.

Red (R) phosphor particles are made of an yttrium oxide compound positively charged on their surfaces. Blue (B) phosphor particles are made of an aluminate compound having β-alumina structure and positively charged on their surfaces. Green (G) phosphor particles are made of an aluminate compound having a β-alumina structure or an yttrium oxide compound positively charged on their surfaces. Paste-like phosphor ink made of red (R), green (G), or blue (B) phosphor particles and an organic binder is applied to grooves between barrier ribs 109, and baked at temperatures ranging from 400 to 590° C. to burn out the organic binder. As a result, phosphor layers 110R, 110B, and 110G—in which phosphor particles of corresponding colors are bound with each other—are formed. It is preferable that thickness L in the direction of lamination of phosphor layers 110R, 110B, and 110G on address electrodes 107 is approx. 8 to 25 times the average diameter of phosphor particles of each color. That is, in order to constantly achieve a certain luminance (emission efficiency) when a phosphor layer is irradiated with an amount of ultraviolet light, the phosphor layer needs to absorb ultraviolet light generated in the discharged space, not allowing to pass therethrough. For this purpose, it is desirable that the phosphor layer has a thickness formed of at least eight layered-, preferably, approx. 20 layered-phosphor particles. Having a thickness beyond 20-layered lamination almost saturates emission efficiency and cannot ensure sufficiently large discharge space 122. Phosphor particles having sufficiently small diameters and spherical shapes, like those obtained by the hydrothermal synthesis method or the like, have a packing factor of the phosphor layer and a total surface area of the phosphor particles larger than those of phosphor particles having non-spherical shapes, even when the number of laminated layers are the same. As a result, phosphor particles having spherical shapes increase the surface area contributing to actual light emission of the phosphor layer, thereby enhancing the emission efficiency. The methods of synthesizing phosphor layers 110R, 11G, and 11B will be described later.

The front panel and the rear panel produced in this manner are placed one on the other so that the respective electrodes on the front panel (display electrodes 103 and display scan electrodes 104) are orthogonal to the address electrodes 107 on the rear panel. Sealing glass is disposed between the panels along the periphery thereof and baked, for example, at temperatures of approx. 450° C. for 10 to 20 min. to form hermetical seal layer 121 (see FIG. 1) for sealing. Next, discharge space 122 is once evacuated to a high vacuum (e.g. $1.1 \times 10^{-4}$ Pa) and filled with a discharge gas (e.g. He—Xe and Ne—Xe inert gas), at a specified pressure, to complete PDP 100. This PDP 100 is aged at a discharge voltage of 175V and at a frequency of 200 kHz for five hours.

FIG. 5 is a schematic diagram showing the structure of an ink dispenser used in forming phosphor layers.

As shown in FIG. 5, ink dispenser 200 includes server 210, pressure pump 220, and header 230. Phosphor ink is pressurized by pressure pump 220 and supplied from server 210, which stores the phosphor ink, to header 230. Header 230 includes ink chamber 230a and nozzle 240 (of which inner diameter ranges from 30 to 120 μm). The phosphor ink, which has been fed to ink chamber 230a with application of pressure, is continuously ejected from nozzle 240. It is desirable that bore diameter D of nozzle 240 is sized at least 30 μm to prevent clogging of the nozzle. It is also desirable that bore diameter D is equal to or smaller than interval W between barrier ribs 109 (approx. 130 to 200 μm) to properly apply the ink to the groove between the barrier ribs. Hence, bore diameter D is usually determined to be 30 to 130 μm.

Header 230 is structured to be driven lineally by a header scanning mechanism (not shown). Continuously ejecting phosphor ink 250 from nozzle 240 while scanning header 230 allow the phosphor ink to be uniformly applied to the grooves between barrier ribs 109 on rear glass substrate 102. Viscosity of the phosphor ink is kept within the range of 1,500 to 50,000 centipoises (CP) at a temperature of 25° C.

This server 210 also has a mixer (not shown). Mixing prevents precipitation of particles in the phosphor ink. Header 230 is integrally formed with ink chamber 230a and nozzle 240 by performing machining and electric discharge machining on a metallic material, inorganic material, or the like.

Forming phosphor layers is not limited to the aforementioned method; other various kinds of methods, such as photolithography, screen printing, and a method of disposing a film including phosphor particles mixed therein, can be employed.

The phosphor ink is prepared by mixing phosphor particles of each color, a binder, and a solvent so that the mixture has a viscosity ranging from 1,500 to 50,000 centipoises (CP). A surface active agent, silica, a dispersant (in amount of 0.1 to 5 wt %) can also be added, as required.

As a red phosphor included in this phosphor ink, a compound expressed by $(Y, Gd)_{1-x}Eu_xBO_3$ or $(Y_{1-x}Eu_x)_2O_3$ is used. In these compounds, the element Eu substitutes for a part of the element Y constituting the matrix of the compounds. It is preferable that the substitution value X of the element Eu with respect to the element Y is in the range of $0.01 \leq x \leq 0.3$. Having X larger than 0.3 causes serious luminance degradation, although it achieves a high luminance. For this reason, such a red phosphor is unlikely to be practical. On the other hand, having X smaller than 0.01 lowers the composition ratio of Eu mainly emitting light, thus decreasing the luminance. The phosphor with decreased luminance can no longer serve as a phosphor.

As a green phosphor, a compound expressed by $xBaO.yMgO.zAl_2O_3.aMnO$, $xBaO.yAl_2O_3.zMnO$, or $YBO_3$:Tb and positively charged on its surface is used.

As a blue phosphor, a compound expressed by $Ba_{1-x}MgAl_{10}O_{17}$:$Eu_x$ or $Ba_{1-x-y}Sr_yMgAl_{10}O_{17}$:$Eu_x$ is used. $Ba_{1-x}MgAl_{10}O_{17}$:$Eu_x$ and $Ba_{1-x-y}Sr_yMgAl_{10}O_{17}$:$Eu_x$ are compounds in which the element Eu or Eu and Sr substitute for a part of the element Ba constituting the matrix of the compounds. The substitution values X, and Y of the element Eu and Sr with respect to the element Ba in the blue phosphor $Ba_{1-x-y}Sr_yMgAl_{10}O_{17}$:$Eu_x$ should preferably be $0.03 \leq x \leq 0.2$, and $0.1 \leq y \leq 0.5$.

Ethyl cellulose or acrylic resin can be used as a binder included in phosphor ink (in an amount of 0.1 to 10 wt % of the ink). α-terpineol or butylcarbitol can be used as a solvent. Polymers, such as PMA and PVA, can also be used as a binder. As a solvent, organic solvent, such as diethyleneglycol and methyl ether, can also be used.

According to this embodiment, phosphor particles are fabricated by a solid-phase firing method, aqueous solution reaction method, atomization firing method, and hydrothermal synthesis method. Hereinafter described are methods of synthesizing each phosphor.

(1) Blue Phosphors $(Ba_{1-x}MgAl_{10}O_{17}:Eu_x$ Fabricated by a Hydrothermal Synthesis Method)

In a mixed solution fabrication process, the materials, i.e., barium nitrate [$Ba(NO_3)_2$], magnesium nitrate [$Mg(NO_3)_2$], aluminum nitrate [$Al(NO_3)_3$], and europium nitrate [$Eu(NO_3)_2$], are mixed in a molar ratio of $Ba(NO_3)_2:Mg(NO_3)_2:Al(NO_3)_3:Eu(NO_3)_2=1-X:1:10:X$ $(0.03 \leq x \leq 0.25)$. This mixture is dissolved in an aqueous medium to prepare a mixed solution. Ion-exchange water or pure water is preferably used for the aqueous medium in that it contains no impurities; however, an aqueous medium containing non-aqueous solvent (e.g. methanol and ethanol) can also be used. Next, the hydrate mixed solution is put into a container made of a corrosion- and heat-resistant material, such as gold and platinum. Then, the hydrate is hydro-thermally synthesized in a high pressure vessel, using equipment capable of heating and pressurizing at the same time, such as an autoclave, at specified temperatures (100 to 300° C.) under specified pressures (0.2 to 10 MPa) for 12 to 20 hours.

Next, the obtained powder is baked in a reducing atmosphere (e.g. containing 5% of hydrogen and 95% of nitrogen), at a specified temperature for a specified period of time (e.g. at 1,350° C. for two hours). Thereafter, the baked powder is classified to provide a desired blue phosphor, $Ba_{1-x}MgAl_{10}O_{17}:Eu_x$. Then, the classified power is baked in an $O_2$—$N_2$ atmosphere at temperatures ranging from 700 to 1,000° C. to reduce the sites adsorbing water ($H_2O$) or hydrocarbon (CxHy). As a result, trivalent Eu ions substitute for a part of bivalent ions (most of the Eu ions in a blue phosphor fabricated in a reducing atmosphere being bivalent) to fill oxygen vacancy. The blue phosphor can be fabricated by an atomizing method—atomizing the hydrate from a nozzle into a high-temperature furnace, without putting it in a gold or platinum container.

$(Ba_{1-x-y}Sr_yMgAl_{10}O_{17}:Eu_x$ Fabricated by a Solid-Phase Reaction Method)

The phosphor is different from the aforementioned $Ba_{1-x}MgAl_{10}O_{17}:Eu_x$ in the materials, and fabricated by a solid-phase reaction method. The materials thereof are described hereinafter.

First, the materials, i.e., barium hydroxide [$Ba(OH)_2$], strontium hydroxide [$Sr(OH)_2$], magnesium hydroxide [$Mg(OH)_2$], aluminum hydroxide [$Al(OH)_3$], and europium hydroxide [$Eu(OH)_2$], are weighted so as to have a required molar ratio. The materials are mixed with $AlF_3$ as a fluxing agent, and baked at specified temperatures (1,300 to 1,400° C.) for a specified period of time (12 to 20 hours). Thus, $Ba_{1-x-y}Sr_yMgAl_{10}O_{17}:Eu_x$ in which quadrivalent ions substitute for Mg and Al ions can be obtained. The average diameter of phosphor particles obtained by this method ranges from approx. 0.1 to 3.0 μm. Next, after the particles are baked in a reducing atmosphere (e.g. 5% $H_2$-95% $N_2$) at specified temperatures (1,000 to 1,600° C.) for a specified period of time (two hours), they are classified by an air classifier to provide the phosphor particles. Then, to remove the sites adsorbing water ($H_2O$) and hydrocarbon (CxHy), the particles are baked in an $O_2$—$N_2$ atmosphere at temperatures ranging from 700 to 1,000° C. Thus, trivalent ions substitute for a part of bivalent Eu ions to fill oxygen vacancy.

In this embodiment, oxides, nitrides, and hydroxides are mainly used as the materials of the phosphors. However, the phosphors can be fabricated using organometallic compounds containing the elements Ba, Sr, Mg, Al, Eu, or the like, such as metal alkoxide and acetylacetone.

(2) Green phosphors $(xBaO.yMgO.zAl_2O_3.aMnO$ Fabricated by a Solid-Phase Reaction Method)

First, the materials, i.e., barium carbonate [$BaCO_3$], magnesium carbonate [$MgCO_3$], aluminum carbonate [$Al_2CO_3$], manganese carbonate [$MnCO_3$]—light-emitting material, are prepared so as to have a required molar ratio. This compound is mixed with a small amount of fluxing agent ($AlF_3$), and baked in air at temperatures ranging from 1,200 to 1,500° C. for two hours. Next, after the compound is lightly milled so that aggregate loosens, it is baked in a nitrogen atmosphere or an $N_2$—$H_2$ atmosphere at temperatures ranging from 1,200 to 1,500° C., and milled again. Then, to reduce the sites adsorbing water ($H_2O$) and hydrocarbon (CxHy), the particles are baked in an oxygen atmosphere or an $O_2$—$N_2$ atmosphere at temperatures ranging from 600 to 1,000° C. Thus, trivalent ions substitute for a part of bivalent Mn ions to fill oxygen vacancy, and a positively charged green phosphor is fabricated.

$(xBaO.yMgO.zAl_2O_3.aMnO$ Fabricated by a Hydrothermal Synthesis Method)

In a mixed solution fabrication process, the materials, i.e. barium nitrate [$Ba(NO_3)_2$], lanthanoids nitrate [$M(NO_3)_3$], magnesium nitrate [$Mg(NO_3)_2$] and aluminum nitrate [$Al(NO_3)_3.9H_2O$], are prepared in an aqueous solution so as to have a required a molar ratio. As light-emitting material, a required amount of manganese nitrate [$Mn(NO_3)_2$] and europium nitrate [$Eu(NO_3)_3.9H_2O$] are added, to fabricate a mixed solution.

Next, into this mixed solution, an aqueous base (e.g. ammonia aqueous solution) is dropped, to form a hydrate. Thereafter, this hydrate and ion-exchange water are put into a container made of a corrosion- and heat-resistant material, such as platinum and gold. This mixed solution is hydrothermally synthesized in a high-pressure vessel, using an autoclave, for example, at specified temperatures under specified pressures for specified periods of time (e.g. 100 to 300° C., 0.2 to 10 MPa, 2 to 20 hours). Then the solution is dried to provide a phosphor $xBaO.yMgO.zAl_2O_3.aMnO$. Next, this powder is baked in a $N_2$ atmosphere or a $N_2$—$H_2$ atmosphere at temperatures ranging from 1,200 to 1,500° C., to fabricate a positively charged green phosphor. At this time, the particle diameter grows to 5 to 15 μm. After these particles are milled by a jet mill until the average diameter reaches 0.1 to 3 μm, they are baked in air or a $N_2$—$O_2$ atmosphere at temperatures ranging from 600 to 1,000° C., to reduce the sites adsorbing water ($H_2O$) or hydrocarbon (CxHy). Thus, a positively charged green phosphor without oxygen vacancy can be provided.

($YBO_3$:Tb Fabricated by a Solid-Phase Reaction Method)

First, the materials, i.e. $Y_2O_3$, $B_2O_3$, and $TB_2O_3$, are prepared so as to have a required molar ratio of the phosphor. The materials are mixed with a small amount of fluxing agent ($NH_4Cl$), baked in a $N_2$ atmosphere or in a $N_2$—$H_2$ atmosphere at temperatures ranging from 1,000 to 1,400° C., and then baked in a $N_2$—$O_2$ atmosphere at temperatures ranging from 600 to 900° C. Thus, a positively charged green phosphor without oxygen vacancy can be provided.

(3) Red Phosphors $((Y, Gd)_{1-x}BO_3:Eu_x$ Fabricated by a Hydrothermal Synthesis Method).

In a mixed solution fabrication process, the materials, i.e., yttrium nitrate [$Y_2(NO_3)_3$], gadolinium nitrate [$Gd_2(NO_3)_3$], boric acid [$H_3BO_3$], and europium nitrate [$Eu_2(NO_3)_3$] are mixed in a molar ratio of $Y_2(NO_3)_3$: $Gd_2(NO_3)_3$: $H_3BO_3$: $Eu_2(NO_3)_3$=1−X:2:X ($0.05 \leq x \leq 0.2$), having a 65 to 35 Y to Gd ratio. This mixture is heat-treated in air at temperatures ranging from 1,200 to 1,350° C. for two hours and classified, to provide a red phosphor. Because the red phosphor is baked in air, oxygen vacancy is relatively small even if the mixture is not baked in an $O_2$—$N_2$ atmosphere. However, defects may occur in the classifying process; thus baking in an $O_2$—$N_2$ atmosphere is preferable.

($Y_{2-x}O_3$:$Eu_x$ Fabricated by a Hydrothermal Synthesis Method)

In a mixed solution fabrication process, the materials, i.e. yttrium nitrate [$Y_2(NO_3)_2$] and europium nitrate [$Eu(NO_3)_2$], are mixed in a molar ratio of $Y_2(NO_3)_2$:$Eu(NO_3)_2$=2−X:X ($0.06 \leq X \leq 0.3$). The mixture is dissolved in ion-exchange water, to fabricate a mixed solution. Next, in a hydration process, an aqueous base (e.g. ammonia aqueous solution) is added to the mixed solution, to provide a hydrate. Thereafter, in a hydrothermal synthesis process, the hydrate and ion-exchange water are put into a container made of a corrosion- and heat-resistant material, such as gold and platinum. Then, the container holding the mixed solution is put into a high-pressure vessel to undergo hydrothermal synthesis. The hydrothermal synthesis takes place for 3 to 12 hours at temperatures ranging from 100 to 300° C. under pressures ranging from 0.2 to 10 MPa, using an autoclave, for example. The compound obtained by hydrothermal synthesis is dried, to provide a desired phosphor of $Y_{2-x}O_3$:$Eu_x$. Next, the phosphor is baked in air at temperatures ranging from 1,300 to 1,400° C. for two hours and then classified. The red phosphor is thus obtained. The phosphor obtained by the hydrothermal synthesis process has a spherical shape and particle diameters ranging from approx. 0.1 to 2.0 μm. Such a diameter and shape are suitable for forming a phosphor layer that exhibits excellent light emission characteristics. Because these red phosphors are baked in air, oxygen vacancy is smaller and thus adsorption of water ($H_2O$) or hydrocarbon (CxHy) is smaller.

Because these phosphors are used for respective phosphor layers, influence of difference in charge on a phosphor application process, the chromaticity change and luminance degradation of a panel, unstable discharge, and other problems can be addressed.

EVALUATION EXPERIMENT 1

In order to evaluate the performance of a plasma display device of the present invention, samples of phosphors of respective colors were produced in accordance with the aforementioned embodiment, and performance evaluation tests were carried out. The experimental results are described below. Each of the plasma display devices produced has a diagonal size of 42 in.—for a high definition (HD) TV screen having a rib-pitch of 150 μm. Each of the PDPs was produced so that the dielectric glass layer was 20 μm thick; the MgO protective layer was 0.5 μm thick; and the distance between the display electrode and the display scan electrode was 0.08 mm. The discharge space was filled with a discharge gas in which 5% of xenon gas was mixed into neon as the major component. The discharge gas was filled in the discharge space with the application of a pressure of 66.5 kPa.

Evaluation results are shown in Table 1.

TABLE 1

| | Green phosphor: $x$BaO•$y$MgO•$z$Al$_2$O$_3$•$a$MnO | | | | | Red phosphor: $(Y, Gd)_{1-x}BO_3$:$Eu_X$ | | Blue phosphor: $Ba_{1-x}Eu_xMgAl_{10}O_{17}$ | |
|---|---|---|---|---|---|---|---|---|---|
| Sample No. | Amount of x | Amount of y | Amount of z | Amount of a | Ratio of trivalent Mn ions to bivalent Mn ions | Amount of x | Fabrication method Ratio of trivalent Eu ions | Amount of x | Ratio of trivalent Eu ions to bivalent Eu ions |
| 1 | 0.7 | 0.05 | 5 | 0.05 | 1.0% | 0.10 | Solid-phase reaction method 100% | 0.05 | 10% |
| 2 | 0.75 | 0.10 | 5.3 | 0.1 | 5.0% | 0.20 | Atomization method 100% | 0.12 | 20% |
| 3 | 0.8 | 0.15 | 5.5 | 0.12 | 15.0% | 0.30 | Aqueous solution reaction method 100% | 0.05 | 50% |
| 4 | 0.9 | 0.18 | 5.9 | 0.15 | 20.0% | 0.15 | Hydrothermal synthesis method 100% | 0.10 | 50% |
| 5 | 0.95 | 0.20 | 6 | 0.2 | 30.0% | 0.15 | Solid-phase reaction method 100% | 0.10 | 60% |
| 6* | 0.85 | 0.15 | 5 | 0.15 | 5.0% | 0.15 | Solid-phase reaction method 100% | 0.10 | 1% |

TABLE 1-continued

| | Green phosphor: $x$BaO•$y$Al$_2$O$_3$•$z$MnO | | | | Red phosphor: $(Y_{1-x})_2O_3$:Eu$_X$ | | Blue phosphor: Ba$_{1-x-y}$Sr$_y$MgAl$_{10}$O$_{17}$:Eu$_X$ | |
|---|---|---|---|---|---|---|---|---|
| | Amount of x | Amount of y | Amount of z | Amount of trivalent Mn ions to bivalent Mn ions | Amount of x | Fabrication method Ratio of trivalent Eu ions | Amount of x | Ratio of trivalent Eu ions |
| 7 | 0.9 | 5.50 | 0.05 | 10% | 0.01 | Hydrothermal synthesis method 100% | 0.01 | 50% |
| 8 | 0.7 | 6.00 | 0.1 | 15% | 0.10 | Atomization method 100% | 0.02 | 50% |
| 9 | 0.85 | 5.00 | 0.15 | 5% | 0.15 | Aqueous solution reaction method 100% | 0.05 | 50% |
| 10 | 0.9 | 5.00 | 0.2 | 30% | 0.20 | Solid-phase reaction method 100% | 0.1 | 50% |
| 11* | 0.9 | 5.00 | 0.2 | 0.10% | 0.20 | Solid-phase reaction method 100% | 0.1 | 50% |

| | Green phosphor: Mixture of 0.8BaO,•5.5Al$_2$O$_3$,•0.12MnO, and ReBO$_3$ | | Red phosphor: $(Y_{1-x})_2O_3$:Eu$_X$ | | Blue phosphor: Ba$_{1-x}$Eu$_X$MgAl$_{10}$O$_{17}$ | |
|---|---|---|---|---|---|---|
| | Ratio of aluminate compound containing 15% of trivalent Mn ions | Amount of ReBO$_3$:Tb % | Amount of x | Fabrication method Ratio of trivalent Eu ions | Amount of x | Ratio of trivalent Eu ions |
| 12 | 50% | Re = Y:50% | 0.15 | Solid-phase reaction method 100% | 0.01 | 50% |
| 13 | 40% | Re = Sc:60% | 0.15 | Solid-phase reaction method 100% | 0.01 | 50% |
| 14 | 60% | Re = La:40% | 0.15 | Solid-phase reaction method 100% | 0.01 | 50% |
| 15 | 70% | Re = Ce:30% | 0.15 | Solid-phase reaction method 100% | 0.01 | 50% |
| 16 | 50% | Re = Gd:50% | 0.15 | Solid-phase reaction method 100% | 0.01 | 50% |
| 17* | 50% | Zn$_2$SiO$_4$:Mn:50% | 0.15 | Solid-phase reaction method 100% | 0.01 | Eu trivalent ions 1% |
| 18* | | Zn$_2$SiO$_4$:Mn | 0.15 | Solid-phase reaction method 100% | 0.01 | Eu trivalent ions 0.5% |

*Sample Nos. 6, 11, 17, and 18 show comparative samples.

Each of sample Nos. 1 through 6 shows evaluation results of a plasma display device using a green phosphor $x$BaO.$y$MgO.$z$Al$_2$O$_3$.$a$MnO, which is fabricated by baking in an O$_2$—N$_2$ atmosphere and positively charged, and a red phosphor (Y, Gd)$_{1-x}$BO$_3$:Eu$_x$, and a blue phosphor BaO$_{1-x}$MgAl$_{10}$O$_{17}$:Eu$_x$. The methods of synthesizing the phosphors, the composition x, y, z, and a of respective materials, and the amounts of trivalent ions with respect to bivalent Eu ions are changed as shown in Table 1.

Each of sample Nos. 7 through 11 shows evaluation results of a plasma display device using a green phosphor $x$BaO.$y$Al$_2$O$_3$.$z$MnO, which is fabricated by baking in an O$_2$—N$_2$ atmosphere, and a red phosphor Y$_{1-x}$O$_3$:Eu$_x$, and a blue phosphor Ba$_{1-x-y}$Sr$_y$MgAl$_{10}$O$_{17}$:Eu$_x$. Similarly, the methods of synthesizing the phosphors, the composition x, y, and z, of respective materials, and the amounts of trivalent ions with respect to bivalent Mn and Eu ions are changed as shown in Table 1.

Each of sample Nos. 12 through 16 is a panel using a mixture of $x$BaO.$y$Al$_2$O$_3$.$z$MnO and ReBO$_3$:Tb—both fabricated by baking in an O$_2$—N$_2$ atmosphere and positively charged, as a green phosphor, and a red phosphor $(Y_{1-x})_2O_3$:Eu$_x$, and a blue phosphor Ba$_{1-x}$Eu$_x$MgAl$_{10}$O$_{17}$. Similarly, the methods of synthesizing the phosphors, the composition x, y, and z of respective materials, and the amounts of trivalent ions with respect to bivalent Mn and Eu ions are changed as shown in Table 1.

Sample No. 6 is a comparative sample, a panel using a blue phosphor that is not sufficiently baked in an $O_2$—$N_2$ atmosphere (the amount of trivalent Eu ions being 1%). Phosphors of other colors are the same as those of sample No. 5. Sample No. 11 is also a comparative sample, a panel using a green phosphor that is not sufficiently baked in an $O_2$—$N_2$ atmosphere (the amount of trivalent Mn ions being 0.1%). Phosphors of other colors are the same as those of sample No. 10. Sample No. 17 is also a comparative sample that has 50% of $Zn_2SiO_4$:Mn mixed in the green phosphor. The red phosphor and blue phosphor are the same as those of sample No. 12. Sample No. 18 is also a comparative sample, a panel using a green phosphor $Zn_2SiO_4$:Mn negatively charged, and a conventional blue phosphor $Ba_{1-x}Eu_xMgAl_{10}O_{17}$ containing less trivalent Eu ions.

Phosphor ink used for forming phosphor layers was prepared by using each kind of phosphor particles shown in Table 1, and mixing the phosphor, resin, solvent and dispersant. According to the measurement results, viscosity of each kind of the phosphor ink (at 25° C.) is kept within the range of 1,500 to 50,000 centipoises (CP). Observations on each phosphor layer formed showed that the phosphor ink was uniformly applied to the side faces of the barrier ribs. In production of each sample, the bore diameter of the nozzle used for application is 100 μm. The phosphor particles used for the phosphor layers have an average diameter ranging from 0.1 to 3.0 μm and a maximum diameter up to 8 μm.

EXPERIMENT 1

First, for each of sample Nos. 1 through 16 and comparative sample Nos. 17 and 18 produced as above, the amount of charge of the green phosphor with respect to reduced ion powder was examined by a glow off method (see *Illuminating Engineering Institution Journal vol.* 76 No. 10, 1992, pp 16-27). The experimental results show that $Zn_2SiO_4$:Mn of sample No. 18 is negatively charged and the green phosphors of other samples are positively charged.

EXPERIMENT 2

The phosphors (blue, green, and red) in the produced PDPs were taken out, and the amount of adsorbed water ($H_2O$), carbon monoxide (CO), and carbon dioxide ($CO_2$) was measured by a thermal desorption spectroscopy (TDS). Each analytical sample used was 100 mg of phosphor taken from the produced panels. The total amount of water generated from each analytical sample was measured when it was heated from room temperature to 1,000° C.

EXPERIMENT 3

The luminance (white, green, blue, and red) and color temperature of each PDP after the PDP manufacturing process were measured with a luminance meter.

EXPERIMENT 4

When each PDP was lit in white on the entire surface thereof, luminance degradation and color temperature were measured as follows. Discharge sustain pulses at a voltage of 175V and at a frequency of 200 kHz were applied to each plasma display device continuously for 500 hours, and the luminance and color temperature of each PDP were measured before and after the application of the pulses. From the measurements, a luminance degradation factor ([luminance after application—luminance before application]/luminance before application)*100) and a color temperature change factor were determined.

Addressing failure at address discharge was determined by existence of flickers in an image. If flickers were found even only in one position, it was recognized as having addressing failure.

EXPERIMENT 5

Whether a nozzle is clogged or not was examined when each green phosphor was continuously applied for 100 hours using the nozzle having a bore diameter of 100 μm.

EXPERIMENT 6

The ratio of bivalent and trivalent Mn and Eu ions was measured by an X-ray absorption near edge structure (XANES) spectrum method.

The results of these experiments are shown in Table 2.

TABLE 2

| Sample No. | Amount of water($H_2O$) adsorbed in phosphor in panel Millimole/g | Luminance degradation factor (%) of panel after application of discharge sustain pulses (175 V, 200 KHz) for 1000 hours White display | Color temperature change factor (%) of panel after application of discharge sustain pulses (175 V, 200 KHz) for 1000 hours White display | Address failure at address discharge and nozzle clogging |
|---|---|---|---|---|
| 1 | 0.032 | −3.5 | −4.5 | None |
| 2 | 0.028 | −3.1 | −4.1 | None |
| 3 | 0.025 | −3.6 | −4.0 | None |
| 4 | 0.021 | −2.5 | −3.5 | None |
| 5 | 0.02 | −2.0 | −3.0 | None |
| 6* | 0.123 | −14.4 | −14.5 | Addressing failure No clogging |
| 7 | 0.03 | −3.3 | −3.9 | Addressing failure No clogging |

TABLE 2-continued

| Sample No. | Amount of water($H_2O$) adsorbed in phosphor in panel Millimole/g | Luminance degradation factor (%) of panel after application of discharge sustain pulses (175 V, 200 KHz) for 1000 hours White display | Color temperature change factor (%) of panel after application of discharge sustain pulses (175 V, 200 KHz) for 1000 hours White display | Address failure at address discharge and nozzle clogging |
|---|---|---|---|---|
| 8 | 0.023 | −2.8 | −3.6 | Addressing failure<br>No clogging |
| 9 | 0.027 | −3.1 | −3.8 | Addressing failure<br>No clogging |
| 10 | 0.018 | −1.9 | −2.9 | Addressing failure<br>No clogging |
| 11* | 0.096 | −10.2 | −10.5 | Addressing failure<br>No clogging |
| 12 | 0.028 | −3.2 | −4.2 | Addressing failure<br>No clogging |
| 13 | 0.025 | −2.8 | −3.5 | Addressing failure<br>No clogging |
| 14 | 0.026 | −3.1 | −4 | Addressing failure<br>No clogging |
| 15 | 0.028 | −3 | −4 | Addressing failure<br>No clogging |
| 16 | 0.029 | −3.2 | −4.2 | Addressing failure<br>No clogging |
| 17* | 0.158 | −15.3 | −16.7 | Addressing failure<br>Clogging |
| 18* | 0.195 | −17.2 | −18.1 | Addressing failure<br>Clogging |

*Sample Nos. 6, 11, 17, and 18 show comparative samples.

As shown in Table 2, for each of comparative sample Nos. 6, 11, 17, and 18, water ($H_2O$) is likely to be adsorbed. Especially for sample Nos. 6 and 11, the combination of phosphors used for the PDPs include a green phosphor $xBaO \cdot yAl_2O_3 \cdot zMnO$ and $BaO \cdot yMgO \cdot zAl_2O_3 \cdot aMnO$, and a blue phosphor $Ba_{1-x}Eu_xMgAl_{10}O_{17}$. Because these phosphors are not baked in an $O_2$—$N_2$ atmosphere, they are likely to adsorb water ($H_2O$) or hydrocarbon (CxHy). Especially, adsorption of water ($H_2O$) is three to seven times as much as that of the phosphor that has been baked. The absolute amount of the adsorbed water is one fifth to one tenth the amount of water; however, the amount of adsorbed carbon monoxide (CO), carbon dioxide ($CO_2$), and hydrocarbon (CxHy) is large. This adsorption causes significant luminance degradation of green and blue during discharge (driving) and significant decrease in the luminance and color temperature (color shift) at white display on the entire panel. However, for each of sample Nos. 6 and 11, because all the phosphors are positively charged, nozzle clogging does not occur.

For each of sample Nos. 17 and 18, a green phosphor $Zn_2SiO_4$:Mn is used. For this reason, the amount of adsorbed water ($H_2O$), carbon monoxide (CO), carbon dioxide ($CO_2$), and hydrocarbon (CxHy) is large, and the luminance degradation caused by ultraviolet light (wavelength: 147 nm) and discharge sustain pulses is large. Additionally, addressing failure and nozzle clogging occur.

In contrast, for each of the PDPs having combination of the green phosphor and blue phosphor, and red phosphor of each of sample Nos. 1 through 5, 7 through 10, and 12 through 16, all the phosphors are baked in an $O_2$—$N_2$ atmosphere. For this reason, the luminance degradation factor of each color caused by ultraviolet light (wavelength: 147 nm) and discharge sustain pulses is small. Therefore, decrease in color temperature or addressing failure does not occur. Additionally, nozzle clogging in application of phosphors does not occur. This is because each of these PDPs use a positively charged green phosphor $xBaO \cdot yMgO \cdot zAl_2O_3 \cdot aMnO$ or $xBaO \cdot yAl_2O_3 \cdot zMnO$ having a β-alumina single crystal structure, and a blue phosphor $Ba_{1-x}Eu_xMgAl_{10}O_{17}$ or $Ba_{1-x-y}Eu_xSr_yMgAl_{10}O_{17}$, both of which are baked in an $O_2$ atmosphere or an $O_2$—$N_2$ atmosphere. This reduces oxygen vacancy in the phosphors and inhibits generation of water ($H_2O$) or hydrocarbon (CxHy) in the panel, thus eliminating luminance degradation caused by discharge and addressing failure caused by deterioration of MgO. The reason why nozzle does not clog up is that the positively charged phosphor of each color is likely to adsorb ethyl cellulose in the binder and thus the dispersibility of the phosphor ink is improved.

As described above, the present invention can stabilize the application of phosphor layers and provide a highly reliable plasma display device having no decrease in the luminance and color temperature and no addressing failure of the panel.

INDUSTRIAL APPLICABILITY

A plasma display device of the present invention can realize a highly reliable plasma display device having no decrease in the luminance and color temperature and no addressing failure of the panel. This plasma display device is useful as an image display device or the like for a TV set or the like.

The invention claimed is:

1. A plasma display device having a plasma display panel in which a plurality of discharge cells having a plurality of colors are disposed, phosphor layers having a color corresponding to the respective discharge cells are disposed, and the phosphor layers are excited by ultraviolet light to emit light, wherein the phosphor layers comprise:

a green phosphor layer made of one of (i) $xBaO \cdot yMgO \cdot zAl_2O_3 \cdot aMnO$ having a β-alumina crystal structure wherein Mn atoms have a bivalent Mn ion concentration of 80-99% and a trivalent Mn ion concentration of 1-20%, wherein $0.7 \leq x \leq 0.95$, $0.05 \leq y \leq 0.2$, $5.0 \leq z \leq 6.0$, and $0.05 \leq a \leq 0.2$, (ii) $xBaO \cdot yAl_2O_3 \cdot zMnO$ having a β-alumina crystal structure wherein Mn atoms have a bivalent Mn ion concentration of 80-99% and a trivalent Mn ion concentration of 1-20%, wherein $0.7 \leq x \leq 0.95$, $5 \leq y \leq 6$, and $0.05 \leq z \leq 0.2$, and (iii) $ReBO_3$:Tb where Re is one of Y, Sc, La, Ce and Gd;

a blue phosphor layer made of one of $Ba_{1-x}Eu_xMgAl_{10}O_{17}$ and $Ba_{1-x-y}Eu_xSr_yMgAl_{10}O_{17}$, wherein $0.05 \leq x \leq 0.2$, and $0.05 \leq y \leq 0.5$, and wherein the one of $Ba_{1-x}Eu_xMgAl_{10}O_{17}$ and $Ba_{1-x-y}Eu_xSr_yMgAl_{10}O_{17}$ has a β-alumina crystal structure wherein Eu atoms have a bivalent Eu ion concentration of 40-90% and a trivalent Eu ion concentration of 10-60%; and a red phosphor layer made of one of $(Y,Gd)_{1-x}Eu_xBO_3$ and $(Y_{1-x}Eu_x)_2O_3$, wherein $0.01 \leq x \leq 0.3$, and wherein Eu atoms have a trivalent Eu ion concentration of 100%.

* * * * *